United States Patent Office 3,433,012
Patented Mar. 18, 1969

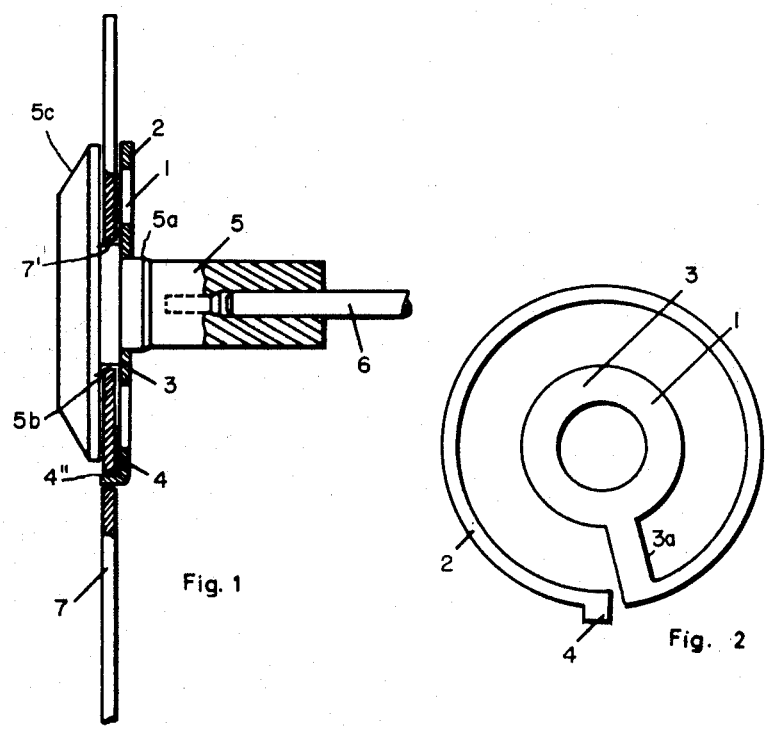
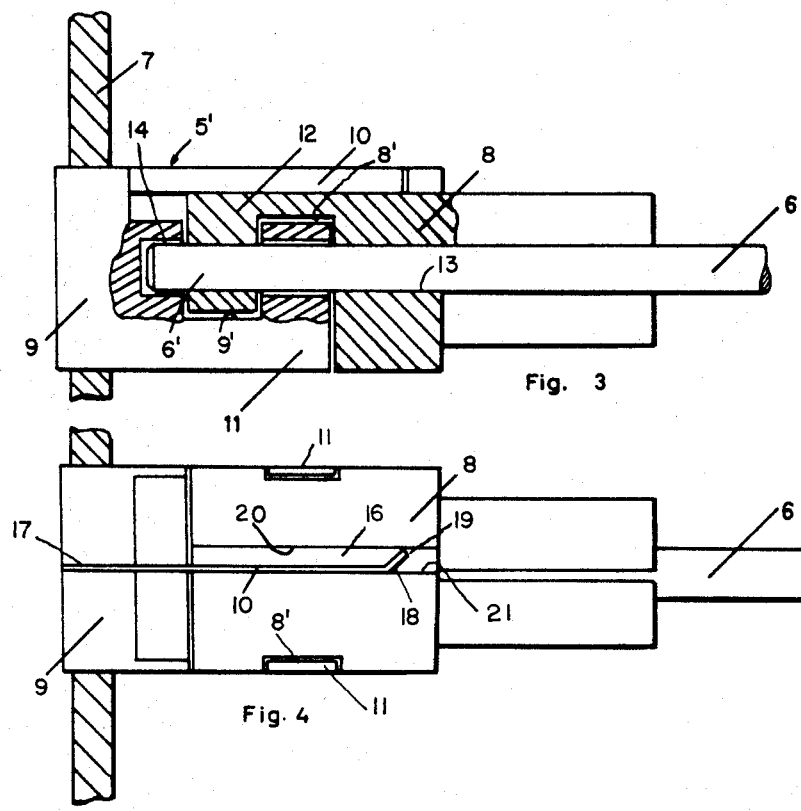

3,433,012
COUPLING DETAINING CLOCK HAND OR POINTER AND ITS SPINDLE
Roland Siefert, Bad Durrheim, and Heinz Odenbach, Irslingen, Germany, assignors to Kienzle Uhrenfabriken G.m.b.H., Schwenningen am Neckar, Germany, a limited-liability company of Germany
Filed Nov. 2, 1966, Ser. No. 591,505
Claims priority, application Germany, Nov. 5, 1965, K 57,580
U.S. Cl. 58—126   2 Claims
Int. Cl. G04b 19/04

ABSTRACT OF THE DISCLOSURE

A coupling for mounting a seconds hand on its spindle comprising two interfitting partially cylindrical members having two planes of juncture to which the spindle is perpendicular. The members are slightly turnable relative to each other against force of a strip spring parallel to the spindle.

---

The present invention relates to a coupling between a clock hand and clock hand arbor or spindle, especially such a coupling between a seconds hand or pointer and the seconds pointer spindle for a clock having a central seconds sweeps pointer.

In large timepieces which are optionally provided with or without central seconds pointers and which are outfitted with essentially the same works, a disadvantage develops in that the use of a large or comparatively massive seconds pointer leads to a considerable reduction in amplitude of the oscillator such as a balance of control speed of the seconds pointer spindle. In mechanical clocks, such as those that are spring wound, this can be overcome by the use of a stronger or more powerful main drive spring when the central seconds pointer is used. Electrical clocks however, do not afford this possibility unless the necessary alterations in the electrical components are made.

The moment of inertia of the employed pointer has been determined as being responsible for the decrease in amplitude of the oscillator. If the pointer is rigidly connected to the seconds spindle the pointer becomes accelerated from zero speed to a maximum speed during the short length of time while the gears execute a turning for an escapement step or an increment of movement if a driven stepping wheel is used. In an example of actual practice of the effects of this sudden and intermittent acceleration, a reduction of swing amplitude of the balance wheel of some 110° has been noted due to the mere addition of a seconds sweep pointer as compared with the amplitude of the balance wheel of the clock when the timepiece was driven with no sweep pointer.

An object of the invention is to lower this reduction in amplitude to a minimum value. In other words, for the given amount of energy expended in driving the timepiece, a maximum amount of that energy should be available to maintain oscillation of the balance, whether the balance be directly driven, as for some types of electric clocks, or indirectly driven through an escapement.

This object is attained in the present invention by means of a coupling between the pointer and the arbor or spindle carrying the pointer, and in particular, in a clock having a sweep seconds pointer. Through the medium of the coupling, the pointer and the spindle are resiliently connected to each other by means of a spring. The spring may be in the form of a blade or leaf spring having an inner central part suitably secured on a pointer mounting member such as a sleeve or collar forced tightly on the spindle, the spring having a resiliently movable outer arm slightly loosely projecting into an eccentric opening in the pointer. This form is, however, limited to a particularly developed pointer and to an especially produced opening therein.

In a modification and further development of the invention the usual pointer mounting collar or sleeve itself is formed as the elastic coupling so that a conventional normal pointer can be used. It has been found by tests that such an elastic coupling between the pointer and spindle reduced the amplitude of the balance by no more than 20° when the same pointer mounted rigidly as mentioned above, reduced amplitude by 110°. The reason for this much smaller effect on the balance swing due to the pointer when the coupling is resilient rather than rigid can be explained in the following manner. The total movement of the pointer for a swing of the balance is the same in both instances, yet the time during which the pointer becomes accelerated is increased by the flexible coupling. The requisite work varies inversely proportionately to the time during which an acceleration occurs. That is to say, since there is a slight increase of acceleration duration there is a substantial diminishing of the energy required to move the pointer. This diminishing of energy for use on the pointer results therefore in an increase in the amplitude of the balance swing when the main energy source remains constant.

In FIGS. 1 to 4 two different species of an elastic coupling between the pointer and the pointer spindle are shown.

FIG. 1 is a side view, partly in section, of a coupling having a leaf spring;
FIG. 2 shows the details for the spring;
FIG. 3 shows substantially in section a pointer mounting collar in section, which is itself a coupling; and
FIG. 4 is a plan of the collar of FIG. 3.

Referring now to FIG. 1, a round pointer-mounting collar 5 having successively outer axial portions 5a of increased diameter, 5b of further increased diameter and an outermost head 5c, is force fitted onto a seconds spindle 6. A coupling of thin sheet stock formed, as by stamping, into a generally circular shape having a central hub-like portion 3 which is secured on the portion of reduced diameter 5 by a suitable method as by forcing a fit. A radial connector 3a is integral with the hub-like portion and a rim 2 which terminates slightly short of the connector 3a with a right angularly bent, short, side-flange projection 4. A seconds hand or pointer 7 having a hole 7' receiving the portion 5b for slight turning of the pointer relative to the mounting collar is situated between the head 5c and the spring coupling, the projection 4 of the latter being received, slightly loose in an eccentric opening 4' in pointer.

In operation, the coupling absorbs shocks which would be imparted to the pointer due to intermittent angular acceleration of the spindle, due to the escapement and balance (not shown) regulating the speed of the spindle 6.

The composite, preferably generally cylindrical pointer bushing or sleeve 5' of FIGS. 3 and 4, as a whole, provides an elastic coupling and it is made up of two axially alined laterally and loosely interfitted portions 8 and 9 on the outer end portion 6' of the seconds spindle 6.

Each portion 8 and 9 is provided with deep transverse major chordal slots 8' and 9' respectively to receive hook-like mating end parts 11 and 12 of the interfitted portions having minor chordal faces, the faces being sufficiently spaced from the slot bottoms so that a small amount of relative angular movement about the spindle axis by the portion is permitted. An axial bore 13 in the portion 8 tightly receives the spindle 6 while an axial bore 14 in the portion 9 carrying the pointer 7 is sufficiently large to permit the mentioned relative movement about the spindle axis. The two portions 8 and 9 are resiliently connected by a strip blade spring 10 largely in a radial plane and in an outwardly open wide groove 16, parallel with the spindle axis, in the portion 8, the spring having an outer end 17 embedded fast in and on the portion 9. The opposite end portion 18 of the spring 10 is bent so that the end 19 engages on one side wall 20 of the groove while the major portion of the spring may lie along and against the opposite wall 21. As the spindle suddenly turns clockwise, i.e. the upper part in FIG. 4 moves downwardly, the wall 20 engages on the spring end 19 but the leftward portion of the spring 10 may flex away from the opposite wall 21 due to the inertia of the pointer. The energy stored in the spring is more slowly expended in turning the pointer with less acceleration.

The spring 10 is effectively lengthened by having a cut-out in the portion 9 inner from the spring as shown in FIG. 3. This does not materially change tendency of the spring 10 to lie against the wall 18 for the major length of the spring.

By having the hook-like ends 11 and 12 received in the slots 8' and 9' with only slight clearance in the axial direction, the axial forces during the forcing of the collar 5' onto the spindle 6 and the point 7 onto the collar 5' can be transferred to spindle without distortion of any spring.

The invention claimed is:

1. In a clock having a balance wheel to control the speed of the clock by a stepping wheel resulting in intermittent turning in a constant direction, a seconds hand disposed for rotating in a plane to which the axis of the spindle is perpendicular, a substantially cylindrical coupling mount for the spindle and hand including inner and outer portions, each portion being mounted on the spindle and latterally interfitting with each other with sufficient clearance for slight relative turning with respect to each other about the spindle axis, the inner and outer portions interfitting at an interfacial plane to which the spindle axis is perpendicular, the inner portion being fixed on the spindle and provided with an external groove parallel with the spindle axis, and said outer portion carrying fast the seconds hand and a leaf spring extending loosely into said groove, whereby in assembly of the clock an exterior axial force may be applied to the mount to force the inner portion on the spindle and to the hand on the outer portion without strain on the spring.

2. In a clock having a balance wheel to control the speed of the clock by a stepping wheel resulting in intermittent turning in a constant direction, a seconds hand disposed for rotating in a plane to which the axis of the spindle is perpendicular, coupling means for the hand and spindle including a round elongated portion force-fitted on the spindle and an outer coaxial portion carrying the hand fast thereon, said inner portion being provided with a reception space in the form of an outwardly open groove in the inner portion and parallel with the spindle axis, a spring in the form of a strip disposed slightly loosely in the groove and having an end fixed on the outer portion, the opposite end portion of the spring having a bend to hold the spring against the walls of the groove, each of the portions being provided with transverse major chordal slots and hook-like major chordal ends laterally received in the slots of the portions to make such portions substantially coaxial and with sufficient clearance for such portions to slightly turn with respect to each other, the outer portion receiving the spindle and slightly turnable with respect thereto, whereby fluctuation in turning is absorbed by action of the spring.

References Cited

UNITED STATES PATENTS

| | | | |
|---|---|---|---|
| 1,397,950 | 11/1921 | Fessenden | 58—126 |
| 1,952,232 | 3/1934 | Axien | 64—27 |
| 2,263,113 | 11/1941 | Wichorek et al. | 64—27 |
| 2,491,453 | 12/1949 | Knobel | 64—15 |
| 2,890,416 | 6/1959 | Walker | 58—126 |
| 2,920,440 | 1/1960 | Ames | 58—126 |
| 3,312,458 | 4/1967 | Bratt | 64—27 |

FOREIGN PATENTS 575,865  4/1958  Italy.

RICHARD B. WILKINSON, *Primary Examiner.*

S. A. WAL, *Assistant Examiner.*

U.S. Cl. X.R.

60—39.82; 64—27; 123—145; 219—270